Jan. 7, 1964 J. W. WARREN 3,116,989
AIR CLEANING APPARATUS
Filed Aug. 18, 1958 2 Sheets-Sheet 1

INVENTOR
John W. Warren
BY
ATTORNEYS

Jan. 7, 1964   J. W. WARREN   3,116,989
AIR CLEANING APPARATUS
Filed Aug. 18, 1958   2 Sheets-Sheet 2

INVENTOR
John W. Warren
BY
ATTORNEYS

United States Patent Office 3,116,989
Patented Jan. 7, 1964

3,116,989
AIR CLEANING APPARATUS
John W. Warren, Butte, Mont., assignor to The Anaconda Company, New York, N.Y., a corporation of Montana
Filed Aug. 18, 1958, Ser. No. 756,499
10 Claims. (Cl. 55—257)

This invention relates to air cleaning, and pertains especially to apparatus for removing finely divided dust particles from air. The invention provides an improved wet dust collector which has been found to rival much more costly apparatus (such as electrostatic precipitation) for the removal of extremely fine dust from air. This application is a continuation-in-part of my copending application Serial No. 562,963, now abandoned, which is in turn a continuation-in-part of my original application Serial No. 386,856, now abandoned.

It is well known that the presence of substantial quantities of siliceous and other dusts in the atmosphere of confined working spaces constitutes a serious health hazard, as well as being objectionable in other ways. It is perhaps less well known that the removal of a large percentage by weight of the suspended dust particles does not necessarily suffice to eliminate the health hazard. To do so it is important that the number of dust particles be reduced to a tolerable level. Yet it not infrequently happens that removal of 95% or more by weight of the dust from dusty air can be accomplished without reducing the number of dust particles suspended in the air by more than 3 to 5%. If the removal of dust from air in confined working places is efficient only from the standpoint of the weight of dust removed, and not from the standpoint of the number of particles removed, then recirculation of the air may result in a progressively increasing atmospheric health hazard even though the dust content of the air, by weight, remains essentially constant.

Electrostatic dust precipitators, and good cloth arrestors or filters, have been recognized heretofore as being the most satisfactory devices for effecting efficient removal, by numbers, of dust particles from the air. Wet dust collectors, like dry-cyclone type dust separators, can readily be designed for efficient removal of a high percentage by weight of dust from an air or other gas stream, but such devices as heretofore known have been relatively inefficient for removal of a large number of very finely divided dust particles from air.

I have discovered that when dust laden air, into which a spray of water droplets has been introduced, is passed at fairly high velocity through a stack of orifice plates formed with orifices of proper shape and size, even the very fine dust particles are effectively wetted and are collected in water droplets, and thereafter can be quite readily removed from the air stream by passing it through apparatus designed to collect the water droplets. Indeed, I have found that in this way it is possible to effect removal of dust particles with an efficiency which rivals good electrostatic precipitation, and with apparatus which is far less costly.

In accordance with my discoveries, a spray of water droplets is delivered into a moving current of dust-laden air. The air is then repeatedly and alternately passed through orifices and caused to expand in all directions outwardly from the axes of the orifices, and as it expands it is directed against baffle surfaces, with the result that the dust particles are effectively wetted and are thereby caused to be collected in water droplets. The current of air is then directed through sinuous passages between impingement surfaces so that the dust-laden water droplets are thrown against such surfaces and by adherence thereto are removed from the current of air.

The air-cleaning apparatus of the invention comprises a dust collector vessel and a moisture eliminator vessel, through which air to be cleaned is serially passed, preferably at high velocity. Water spray heads are provided for delivering a spray of water droplets into the air entering the collector vessel, preferably in concurrent relationship with the incoming air. The collector vessel contains a stack of closely spaced orifice plates which extend transversely completely across the path of flow of air through the collector vessel. Each orifice plate is perforated by a large number of long narrow orifices, the shape, size, and spacing of which is of major importance to efficient operation of the apparatus. Thus, each orifice in each plate should have a length-to-width ratio not exceeding about 40 and not less than about 10, and it should be spaced from adjacent orifices in the same plate by a distance not less than about twice its width. The orifices in each plate of the stack are staggered laterally but preferably not longitudinally with respect to the orifices in the adjacent plate on the downstream side, and the space between plates should be less than the space between orifices in each plate. The plates themselves should be thin—preferably less than the width of the orifices formed in them. The orifices must be small, preferably only about ⅛ inch wide, and the space between plates must be correspondingly small, or dust collection efficiency of the apparatus will be low.

Upon passage of the air stream with its load of dust particles and moisture droplets through such a stack at high velocity, the dust particles are effectively wetted and even the extremely fine dust particles are thereby collected in water droplets of substantial size and mass.

In the moisture eliminator vessel, through which the current of air next passes, is an assemblage of closely spaced impingement plates disposed in zigzag array along the path of flow of the air. The dust-laden water droplets carried by the air flowing through the sinuous passages between this array of impingement plates are caused by their own inertia to impinge on and adhere to the impingement plates, and thereby they are removed from the air. Each impingement plate is provided at each reversal of its direction with a trough extending the length of the plate and having its open side facing into the current of air to catch water blown by the air along the face of the plate. Thus dust-laden water which has once impinged on and adhered to a face of one of the impingement plates is prevented from being blown therefrom and being returned to suspension in the air even when the velocity of the air current passing between the plates is very high.

The foregoing and other features of the invention are described in somewhat greater detail below with reference to the accompanying drawings, in which FIG. 1 is a side elevation, largely in section, of a form of air-cleaning apparatus according to the invention, in which the collector vessel and the moisture eliminator vessel are connected together at an angle to each other;

Figure 1:
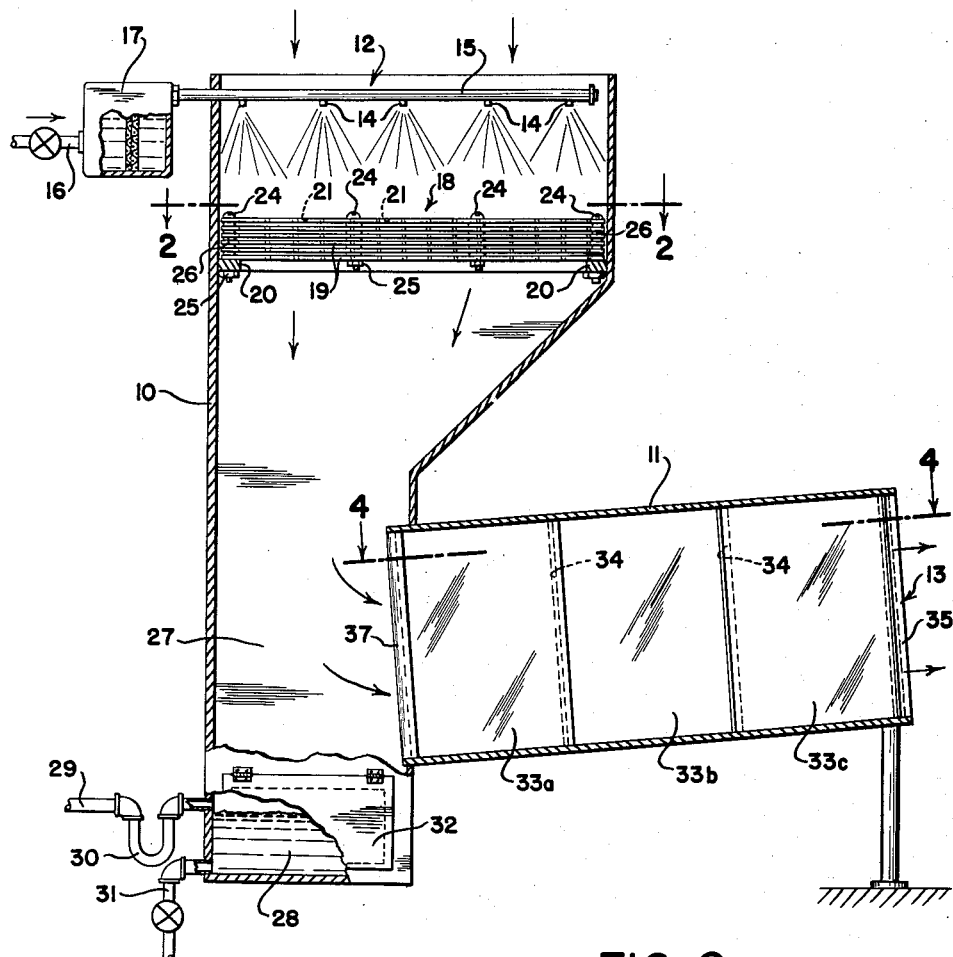
Figure 5:
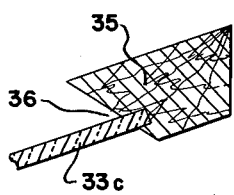
FIG. 5 is an enlarged cross section of the molding at the discharge end of one of the impingement plates.
Figure 6:
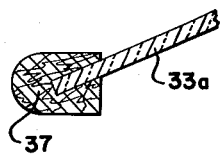
FIG. 6 is an enlarged cross section of the molding at the air inlet end of one of the impingement plates.

Referring to FIG. 1, the apparatus comprises a dust collector vessel 10 and a moisture eliminator vessel 11 joined together so that a current of air may be passed serially through them. The air enters through the upper end 12 of the collector vessel and is discharged through the free end 13 of the moisture eliminator vessel. Flow of air through the apparatus can be induced equally satisfactorily by a blower located upstream with respect to the collector vessel, or by a suction fan located downstream with respect to the moisture eliminator vessel.

A series of water spray heads 14, connected to one or more water header pipes 15, are provided for directing a spray of water droplets into the stream of air adjacent the inlet end 12 of the collector vessel. The spray heads 14 are distributed throughout the entire cross-sectional area of the collector vessel, so that water can be sprayed uniformly into all parts of the incoming air stream. The spray heads preferably are arranged so as to direct the moisture spray in concurrent relation with the air stream. Water is delivered to the header pipes 15 from a valve-controlled main supply pipe 16, and preferably through a strainer 17 to remove dirt particles that might clog the spray heads.

On the downstream side of the spray heads 14 is a stack 18 of orifice plates 19. This stack of plates extends transversely across the path of flow of air through the dust collector vessel, and intercepts the entire cross-sectional area thereof. The stack of plates is supported in place by being secured to a ledge 20 which extends around the interior periphery of the vessel 10 and is welded or otherwise firmly attached thereto.

Figure 2:
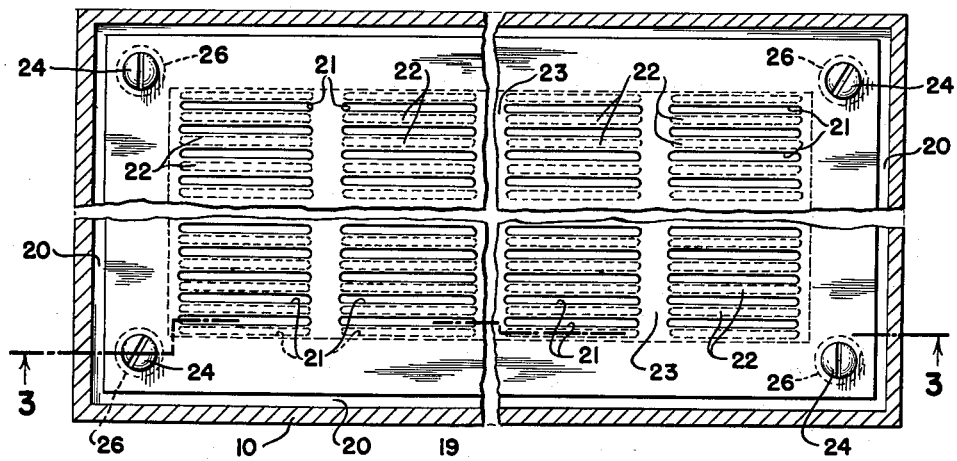
FIG. 2 is a plan view on an enlarged scale of the stack of orifice plates, taken substantially along the line 2—2 of FIG. 1.
Figure 3:
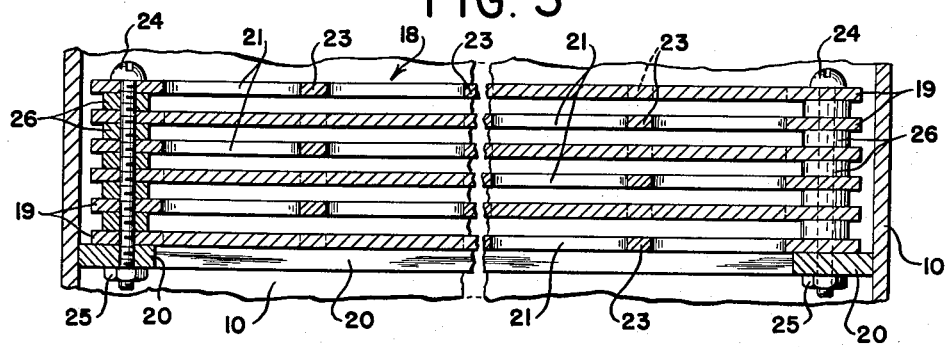
FIG. 3 is a vertical section through the stack of orifice plates, taken substantially along the line 3—3 of FIG. 2.

The orifice plates 19, and their arrangement in the stack 18, are shown in detail and on an enlarged scale in FIGS. 2 and 3. Each plate 19 has a cross-sectional size and shape such that it fits loosely within but substantially fills the entire cross section of the dust collector vessel 10. Each plate is perforated by a large number of small, long and narrow orifices 21. While the orifices are elongated, they should not be overly long, i.e. the length-to-width ratio of each orifice should not exceed 40 nor be less than 10. Each orifice is separated laterally from its neighbors in the same plate by a baffle area 22 which should be at least twice as wide as the orifices 21; and similarly each orifice is separated longitudinally from its neighbors in the same plate by a baffle area 23 which should be about the same width as the baffle areas 22. The plates themselves should be as thin as possible without unduly sacrificing mechanical strength, and in any event should be no thicker than the width of the orifices. The orifices in each plate are staggered laterally, but preferably not longitudinally, with respect to the orifices in the adjacent plate on the downstream side, so that air flowing through the stack of plates must necessarily follow a tortuous path. The space between the plates should be less than the width of the areas 22 between orifices, but it should exceed the width of the orifices themselves.

The plates 19 are clamped together in the stack 18 by bolts 24 and nuts 25, and are held in the correct spaced apart relation to one another by spacer rings 26.

The physical dimensions of the orifices and other elements of the stack of plates 18 are important for efficient operation of the apparatus. While it is desirable to make the orifices 21 as large as possible to minimize frictional resistance to pasage of air through the orifice plates, I have found that if the width of the orifices exceeds about ⅛ inch, and if the spacing between orifice plates exceeds about 3/16 inch, the efficiency with which very fine dust particles can be separated from the air begins to decrease substantially.

In the form of apparatus shown in FIG. 1, the moisture eliminator vessel 11 extends laterally from the lower end of the dust collector vessel 10. In this form of apparatus, the lower portion 27 of the dust collector vessel is of reduced cross-sectional area. This design results in an increased velocity of air stream as it makes the approximately right angle turn in its path of flow from the dust collector vessel into the moisture eliminator vessel. Thereby a considerable portion of the heavier water droplets are thrown directly into a sump 28 at the base of the collector vessel. A drain pipe 29 provided with a trap 30 communicates with the interior of the sump 28 at a point somewhat above its bottom, to prevent the level of water from rising undesirably in the sump. A valved drain 31 also is provided to permit draining the sump completely when such is required or desired. An access door 32 is provided to facilitate periodic cleaning of the sump.

Figure 4:
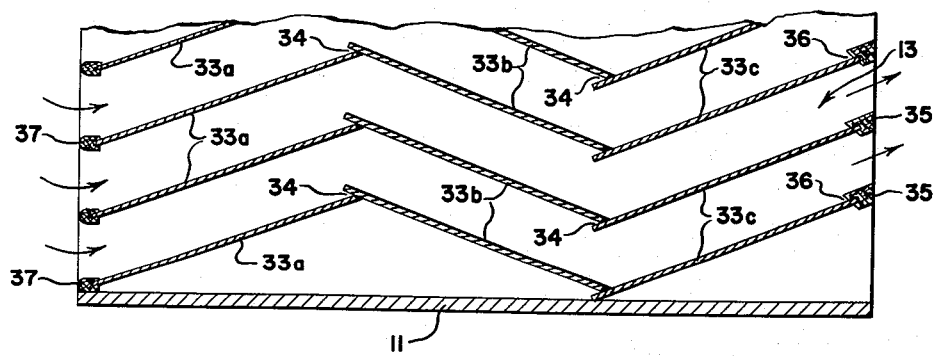
FIG. 4 is a horizontal section through the zigzag array of impingement plates, taken substantially along the line 4—4 of FIG. 1.

The moisture eliminator vessel 11 contains an assemblage of closely spaced impingement plates 33a, 33b, 33c, arranged in zigzag array along the path of flow of the air stream. The arrangement of the impingement plates is best shown in FIG. 4. The downstream end portion of each plate 33b, 33c, overlies the upstream edge of the preceding plate 33a, 33b, respectively, so as to form a vertical V-shaped trough 34 at the junction of each pair of plates in the zigzag array. Each plate 33b preferably is welded, soldered, cemented, or otherwise joined in water-tight relation with the adjacent plates 33a and 33c so water cannot be forced through the bottoms of the troughs 34. Since no plates adjoin the downstream ends of the last plates 33c in each zigzag array, these plates are provided at their downstream edges, adjacent the discharge end 13 of the vessel 11, with molding strips 35. That edge of each molding strip 35 which adjoins the plate is cut at an angle so as to form with the plate a vertical V-shaped trough 36 similar to the troughs 34. The upstream plates 33a may be provided at their upstream edges with protective and stiffening moldings 37. The edges of these moldings which face into the air stream are preferably rounded to present an approximately streamlined surface to the air stream.

Each zigzag array of plates 33a, 33b, 33c is spaced laterally from the adjacent similar group of plates by a distance that is small enough so that the air stream flowing between the plates must follow a sinuous path. The spacing should be close enough so that a straight line cannot be drawn from the inlet to the discharge end of the eliminator vessel without intersecting each plate of at least one zigzag array.

The plates 33a, 33b, etc., should be smooth and preferably are made of glass or some plastic material such as polystyrene or methyl methacrylate polymer which is available in smooth-surfaced sheet form. A smooth surface is desirable to minimize frictional resistance to the passage of air through the sinuous passages between and defined by the assemblage of plates in the above-described zigzag array. However, it is possible and practical to make the plates of metal or any other desired material.

Operation of the above-described apparatus is as follows: A current of dust-laden air is passed through the chamber 10 and 11 (FIG. 1) in the direction indicated by the arrows. Water from the main 16 is fed into the header pipes 15, so that a spray of water droplets is continuously discharged into the moving stream of air. The arrangement of the spray heads 14 is of course such as to effect fairly uniform distribution of the water droplets throughout the entire cross section of the air stream. It has been found, in general, that about one gallon of water for each 750 cubic feet of dust-laden air is a satisfactory amount of water to deliver into the air stream through the spray heads 14.

The air stream with its load of dust particles and water droplets next flows through the stack 18 of orifice plates. The extremely fine dust particles which the apparatus is designed to remove (10 microns or less in diameter) may be regarded as having negligibly small mass or weight, and negligibly small volume. They do, however, possess appreciable surface and cross-sectional area. The air in which these particles are suspended, as it passes through the orifices 21 and then into the space between orifice plates, alternately expands and is compressed. Evidently in the course of these alternate expansions and contractions an initial small amount of water is condensed upon the particle surfaces. Once a particle has been slightly wetted, the moisture on it serves as a cohesive or adhesive medium by which additional moisture may be collected, giving the particle enough mass so that it may be driven against the wet baffle areas 22 of the orifice plates or otherwise collected in water droplets of substantial size and weight.

The precise mechanism by which these very fine dust particles become wetted in the course of passing through the orifice plates is not fully understood. It has been found, however, that by numbers (not merely by weight) they are substantially all wetted and collected in water droplets as a result of passing the dust-laden air through a stack of at least four and preferably six orifice plates formed with suitably proportioned and spaced orifices and baffle areas. For efficient wetting and subsequent removal of the very fine particles the length of the orifices in proportion to their width must not exceed about 40 to 1 nor be less than about 10 to 1. Moreover, if the orifices or the space between orifice plates are very large, the efficiency of collection of the extremely fine dust particles declines. For high collection efficiencies the width of the orifices should not exceed about 1/8 inch and the space between orifice plates should not exceed about 3/16 inch. With apparatus according to this invention comprising four orifice plates, in which the orifices and plate spacings were of these dimensions, and in which the orifice lengths were 1½ inches, the space between orifices in each plate was ¼ inch, and the plate thickness was substantially 3/10 inch, collection efficiencies over 98% by number of all dust particles smaller than 10 microns have been consistently achieved. Collection of the larger particles is relatively easy and is even more efficient. These results are attained with a pressure drop of only 2 inches of water through the stack of orifice plates, and with an air treating capacity of over 1000 cubic feet per minute per square foot of cross-sectional area of the stack of orifice plates.

The current of air emerging from the stack of orificed baffle plates now carries its load of dust within the relatively massive water droplets. As the air stream is directed into the constricted region 27 in the lower half of the collector vessel 10, its velocity is increased in proportion to the reduction in its cross-sectional area. Then, as the air stream turns sharply through substantially a right angle to enter the eliminator vessel 11, the heavier dust-laden water droplets are thrown into the sump 28 at the base of the collector vessel.

The water droplets remaining in the air stream are substantially completely removed as the air flows through the eliminator vessel. In this vessel, as the air flows along its sinuous path between the impingement plates 33a, 33b, 33c, the water droplets are caused to strike against the impingement plate surfaces, and there they adhere. They carry with them the wetted dust particles, so that the plates acquire a film of dust-bearing moisture. This film is blown by the air stream into the vertical troughs 34 and 36 at the downstream edges of the plates, and the water which collects there drains under the force of gravity to the bottom of the vessel 11. As will be seen from FIG. 1, the eliminator vessel slopes downwardly toward the collector vessel, and the dust-bearing water which is separated from the air in the eliminator vessel thereby is enabled to drain into the sump 28.

Water is drained from the sump 28, through the drain pipe 29, at substantially the same rate as it enters the sump, so that the liquid level in the sump is maintained constant. There is some tendency for the heavier dust particles in the water which collects in the sump to settle out and form a mud layer near the bottom of the sump. From time to time, therefore, it may be desirable to empty the sump completely by opening the bottom drain pipe 31, and to enter and clean the sump through the access door 32.

Unless the air entering the collector vessel is saturated with moisture, there will be some humidification of the air and attendant reduction in its dry bulb temperature as a consequence of its passage through the collector and eliminator vessels. However, when the wet bulb depression of the incoming air is substantial, the air does not become saturated in the course of passing through the apparatus, nor in fact is its relative humidity even necessarily increased to a very high value.

It is possible and practical to design the apparatus so that the pressure drop through it is even a little less than for the form of apparatus shown in the drawings, by constructing the vessel 11 as a straight line continuation of the collector vessel 10, thus eliminating the substantial right angle through which the air stream must turn in passing from the collector vessel to the eliminator vessel in the form of apparatus shown in FIG. 1. In this straight line modification of the apparatus, a single vessel may house adjacent one end a collector section comprising the water sprays and stack of orificed baffle plates, and adjacent the other end an eliminator section comprising the staggered array of impingement plates. By providing adequate impingement plate capacity, the modified straight line form of apparatus can be designed to effect as complete removal of dust from the air as does the particular embodiment of apparatus shown in the drawings; and with some saving in power requirements for normal operation.

The new air-cleaning apparatus is substantially as efficient and effective for removing dust from air in confined working areas as is electrostatic precipitation; and the quality of the cleaned air is as free from objection on pathological grounds as is air cleaned by conventional electrostatic precipitation equipment. At the same time the new and improved wet collection apparatus is much simpler and less costly to manufacture then electrostatic precipitation equipment of equal capacity. Its efficiency, simplicity and other advantages make the new apparatus eminently suited for maintaining a clean, breathable atmosphere in the confined working areas of mines, quarries, and similar locations where dust-producing conditions prevail.

I claim:

1. In air-cleaning apparatus for removing extremely finely divided dust particles from air, comprising a dust collector vessel and a moisture eliminator vessel through which air to be cleaned may be serially passed, water spray heads for delivering a spray of water droplets into air entering said collector vessel, and means in said moisture eliminator vessel for removing dust-laden water droplets from the air, the improvement comprising a stack of spaced orifice plates extending transversely across the path of air flow through said collector vessel, each such plate being perforated by a large number of long narrow orifices arranged in side-by-side relationship, each orifice in each plate having a length-to-width ratio not exceeding about 40 and not less than about 10 and being spaced from adjacent orifices in the same plate by a distance not less than twice its width, the orifices in each plate being staggered laterally with respect to the orifices in the adjacent plate on the downstream side of the stack, whereby dust particles carried by the air are effectively wetted as the air flows through said stack of plates.

2. Air-cleaning apparatus for removing extremely finely divided dust particles from air, comprising a dust collector vessel and a moisture eliminator vessel through which air to be cleaned may be serially passed, water spray heads for delivering a spray of water droplets into air entering said collector vessel, a stack of spaced orifice plates extending transversely across the path of air flow through said collector vessel, each such plate being perforated by a large number of long narrow orifices arranged in side-by-side relationship, each orifice in each plate having a length-to-width ratio not exceeding about 40 and not less than about 10 and being spaced from adjacent orifices in the same plate by a distance not less than twice its width, the orifices in each plate being staggered laterally with respect to the orifices in the adjacent plate on the downstream side of the stack, whereby dust particles carried by the air are effectively wetted as the air flows through said stack of plates and are collected in water droplets, and an assemblage of closely spaced impingement plates disposed in zigzag array along the path of flow of air in said eliminator vessel, each impingement plate being provided at each reversal of its direction with a trough extending the length thereof and having its open side facing into the current of air to catch water blown by the air along the face of said plate, whereby dust-laden water droplets carried by the air stream flowing through the eliminator vessel which impinge on and adhere to said impingement plates are caught in said troughs.

3. In air-cleaning apparatus for removing extremely finely divided dust particles from air, comprising a dust collector vessel and a moisture eliminator vessel through which air to be cleaned may be serially passed, a plurality of water spray heads disposed within said collector vessel adjacent the air inlet end thereof for delivering a spray of water droplets concurrently into air flowing through said vessel, and means in said moisture eliminator vessel for removing the dust-laden water droplets from the air, the improvement comprising a stack of spaced orifice plates extending transversely across the path of flow of air through said collector vessel, each of said orifice plates being perforated by a multitude of orifices each having a length-to-width ratio not exceeding about 40 and not less than about 10 and being spaced from adjacent orifices in the same plate by a distance not less than twice its width, the orifices in each plate being staggered laterally but not longitudinally with respect to the orifices of the adjacent plate on the downstream side thereof and the space between plates being less than the space between orifices in each plate, whereby dust particles carried by the air are effectively wetted as the air flows through said stack of plates.

4. In air-cleaning apparatus for removing extremely finely divided dust particles from air, comprising a dust collector vessel and a moisture eliminator vessel through which air to be cleaned may be serially passed, a plurality of water spray heads disposed within said collector vessel adjacent the air inlet end thereof for delivering a spray of water droplets concurrently into air flowing through said vessel, and means in said moisture eliminator vessel for removing dust-laden water droplets from the air, the improvement comprising a stack of at least four spaced orifice plates extending transversely across the path of flow of air through said collector vessel, each of said plates being formed with a large number of long relatively narrow orifice openings each having a width not substantially exceeding ⅛ inch and a length not substantially exceeding 5 inches nor substantially less than 1¼ inches which are separated laterally and longitudinally from each other by distances not less than twice their own widths, the orifice openings of each plate in the stack being staggered laterally but not longitudinally with respect to the orifice openings of the adjacent plate on the downstream side thereof and the space between plates being not substantially greater than 3/16 inch, whereby dust particles carried by the air are effectively wetted as the air flows through said stack of plates.

5. In air-cleaning apparatus for removing extremely finely divided dust particles from air, comprising a dust collector vessel and a moisture eliminator vessel through which air to be cleaned may be serially passed, water spray heads for delivering a spray of water droplets into air entering said collector vessel, and means in said moisture eliminator vessel for removing dust-laden water droplets from the air, the improvement comprising a stack of spaced orifice plates extending transversely across the path of air flow through said collector vessel, each such plate being perforated by a large number of long narrow orifices, each orifice in each plate having a length-to-width ratio not exceeding about 40 and not less than about 10 and being spaced from adjacent orifices in the same plate by a distance not less than twice its width, the orifices in each plate being staggered with respect to the orifices in the adjacent plate on the downstream side of the stack and the space between plates being less than the space between orifices in each plate, the orifice plates themselves each having a thickness less than the width of the orifices therein, whereby dust particles carried by the air are effectively wetted as the air flows through said stack of plates.

6. In air-cleaning apparatus for removing extremely finely divided dust particles from air, comprising a dust collector vessel and a moisture eliminator vessel through which air to be cleaned may be serially passed, a plurality of water spray heads disposed within said collector vessel adjacent the air inlet end thereof for delivering a spray of water droplets concurrently into air flowing through said vessel, and means in said moisture eliminator vessel for removing dust-laden water droplets from the air, the improvement comprising a stack of spaced orifice plates extending transversely across the path of flow of air through said collector vessel, each of said plates being formed with a large number of long relatively narrow orifice openings each having a width not substantially exceeding ⅛ inch and a length-to-width ratio not exceeding about 40 and not less than about 10 which are separated laterally from each other, the orifice openings of each plate in the stack being staggered laterally with respect to the orifice openings of the adjacent plate on the downstream side thereof, whereby dust particles carried by the air are effectively wetted as the air flows through said stack of plates.

7. In an air cleaning apparatus as set forth in claim 6, the further improvement in which the stack contains at least four spaced orifice plates, and the orifice openings of each plate are located at the same relative positions longitudinally with respect to the orifice openings of the adjacent plate on the downstream side thereof.

8. In an air cleaning apparatus as set forth in claim 5, the further improvement in which the orifices of the plates are spaced laterally by distances not less than twice their own widths.

9. In an air cleaning apparatus as set forth in claim 5, the further improvement in which the space between the plates is not substantially greater than 3/16 inch.

10. In an air cleaning apparatus as set forth in claim 6, the further improvement in which the orifices of the plates are separated laterally by distances not less than twice their own widths, and in which the space between the plates is not substantially greater than 3/16 inch.

References Cited in the file of this patent

UNITED STATES PATENTS

| | | |
|---|---|---|
| 879,273 | Kinealy | Feb. 18, 1908 |
| 1,138,081 | Carrier | May 4, 1915 |
| 1,826,912 | Weston | Oct. 13, 1931 |
| 1,951,015 | Gibson et al. | Mar. 13, 1934 |
| 2,183,136 | Downs | Dec. 12, 1939 |
| 2,711,308 | Cogan | June 21, 1955 |
| 2,802,543 | Clark | Aug. 13, 1957 |